(12) United States Patent
Bonnet et al.

(10) Patent No.: US 8,182,912 B2
(45) Date of Patent: May 22, 2012

(54) COATING COMPOSITIONS FOR INORGANIC SUBSTRATES

(75) Inventors: Anthony Bonnet, Beaumont le Roger (FR); Michael Werth, Bernay (FR); Walter Kosar, Pottstown, PA (US); Scott Gaboury, Blue Bell, PA (US); Ophelie Rousseau, St. Cyr l'ecole (FR)

(73) Assignees: Arkema France, Colombes (FR); Arkema Inc., King of Prussia, PA (US)

( * ) Notice: Subject to any disclaimer, the term of this patent is extended or adjusted under 35 U.S.C. 154(b) by 747 days.

(21) Appl. No.: 11/577,567

(22) PCT Filed: Oct. 19, 2005

(86) PCT No.: PCT/EP2005/011797
§ 371 (c)(1), (2), (4) Date: Feb. 4, 2009

(87) PCT Pub. No.: WO2006/042764
PCT Pub. Date: Apr. 27, 2006

(65) Prior Publication Data
US 2009/0155570 A1 Jun. 18, 2009

Related U.S. Application Data

(60) Provisional application No. 60/647,196, filed on Jan. 26, 2005, provisional application No. 60/702,110, filed on Jul. 25, 2005, provisional application No. 60/647,310, filed on Jan. 26, 2005.

(30) Foreign Application Priority Data

Oct. 19, 2004 (FR) .................................... 04 11066
Oct. 19, 2004 (FR) .................................... 04 11068

(51) Int. Cl.
*B32B 5/16* (2006.01)
(52) U.S. Cl. ........... 428/327; 427/180; 524/504; 525/72
(58) Field of Classification Search .................. 428/327; 525/72; 524/504; 427/180
See application file for complete search history.

(56) References Cited

U.S. PATENT DOCUMENTS

| 5,736,610 A | 4/1998 | Nishi et al. |
| 5,965,275 A | 10/1999 | Nishi et al. |
| 6,166,141 A * | 12/2000 | Maeda et al. ................. 525/199 |
| 7,241,817 B2 * | 7/2007 | Bonnet et al. ................. 522/156 |

FOREIGN PATENT DOCUMENTS

| GB | 2072203 | * | 3/1980 |
| WO | WO-2006/042764 A2 | * | 4/2006 |

* cited by examiner

*Primary Examiner* — Peter D. Mulcahy
*Assistant Examiner* — Henry Hu
(74) *Attorney, Agent, or Firm* — Thomas F. Roland

(57) ABSTRACT

The invention relates to a coating composition comprising a radiation grafted functionalized fluoropolymer. This coating is preferably, in the form of a powder coating. The coating can be used on inorganic substrates, especially un-primed metals. The invention also relates to the coated inorganic substrate and to the use of the coating composition to protect the inorganic substrate, especially from corrosion.

13 Claims, No Drawings

COATING COMPOSITIONS FOR INORGANIC SUBSTRATES

This application claims benefit, under U.S.C. §119 or §365 of PCT applications PCT/EP 05/011653, filed Oct. 13, 2005 and PCT/EP 05/011797, filed Oct. 19, 2005; French Applications Number FR 04.11066, filed Oct. 19, 2004 and Number FR 04.11068, filed Oct. 19, 2004; and US Provisional applications U.S. 60/647,196, filed Jan. 26, 2005; U.S. 60/647,310, filed Jan. 26, 2005; and U.S. 60/702,110, filed Jul. 25, 2005.

FIELD OF THE INVENTION

The invention relates to a coating composition comprising a radiation grafted functionalized fluoropolymer. This coating is preferably in the form of a powder coating. The coating can be used on inorganic substrates, especially un-primed metals. The invention also relates to the coated inorganic substrate and to the use of the coating composition to protect the inorganic substrate, especially from corrosion.

THE TECHNICAL PROBLEM

Fluoropolymers, in particular poly(vinylidene fluoride) (PVDF), are used in applications which require high resistance to heat, high resistance to chemicals and good barrier properties to liquids and to gases. Thus, they are very useful for protecting substrates. Furthermore, they have both excellent resistance to ageing, in particular resistance to ultraviolet radiation, and very good resistance to abrasion, so that they retain their protective properties for a long time.

However, it is known that fluoropolymers suffer from a problem of adhesion to certain substrates, in particular metals or glass. The coating made of fluoropolymer is then capable of becoming detached, which is harmful to the protection of the substrate. Generally, the problem of adhesion is solved by the application of a primer layer which has good adhesion to the substrate and which makes possible binding to the polymer.

In the case of powder coatings containing fluoropolymers, in particular of PVDF, several systems which make possible attachment of the PVDF to substrates are known but their effectiveness is reduced because additives having poorer resistances to heat or to chemical attacks have to be employed. Current commercial PVDF coatings, that usually refer to a 70:30 mixture of a PVDF polymer with an acrylic copolymer as resin binder along with other additives and pigments, require a primer system for optimum adhesion. Yet, primers add an additional step to the coating process. Furthermore, liquid primers typically contain hazardous solvents, which can overshadow the environmental benefits of powder coatings. Though powder primers are available, they still impose an additional coating step. Powder primers also increase the overall coating thickness, which may reduce impact resistance and flexibility.

There has been a continuing effort to switch from solvent-based coatings to powder coatings to take advantage of the environmental, safety and productivity benefits of a powder coating process. Current PVDF coatings are applied via a solvent dispersion process. The solvents used are VOC's (Volatile Organic Compounds), requiring expensive exhaust treatment (e.g. thermal oxidizer units). Additionally, some solvents are flammable, toxic, and/or hazardous air pollutants (HAPs). A powder version of PVDF coatings offers many safety and environmental benefits. Some PVDF powder coating formulations have been reported in the following documents: U.S. Pat. No. 4,770,939, Sep. 13, 1988, to LABO-FINA/SIGMA; U.S. Pat. No. 5,229,460, Jul. 20, 1993, to EVODEX though none has been commercially successful to date.

The grafting of a graftable compound to a polymer chain is a well-known operation which is already employed on a large scale to modify the physico-chemical properties of polymers. Thus, maleic anhydride is grafted to a polyolefin (polyethylene, polypropylene) in the melt in an extruder. To do this, a radical initiator, the decomposition temperature of which has to be carefully chosen, is added to the molten blend. The grafting using a radical initiator to a fluoropolymer which comprises hydrogen atoms in its structure is much more difficult. Thus, this explains why the grafting of maleic anhydride to PVDF has not been described to any great extent. Furthermore, the contents of maleic anhydride grafted to PVDF are generally low and the grafting efficiency is therefore poor. A large portion of maleic anhydride therefore remains ungrafted and has to be removed in another stage. The technique of grafting by extrusion additionally uses high temperatures and a high shearing which are capable of decomposing the fluoropolymer chains and of releasing hydrofluoric acid, which may be troublesome if it is not carefully removed. It has now been found that grafting using irradiation makes it possible to obtain more efficient grafting than grafting using a radical initiator, and results in excellent properties of protection from corrosion. The term "radiation grafted fluoropolymer" is used for simplicity's sake in the rest of the specification for the fluoropolymer that is modified by radiation grafting.

There is a need for a fluoropolymer coating that offers excellent adhesion to an inorganic substrate, especially un-primed metals and an excellent protection. Surprisingly it has now been found that a coating comprising a radiation grafted fluoropolymer optionally blended with a non-functionalized fluoropolymer and/or an acrylic polymer offers excellent adhesion to inorganic substrates, especially un-primed metals, and excellent protection. As an additional benefit, said coating composition may be in the form of a powder which also offers the advantages of the powder coating process discussed above.

The present invention relates to a coating composition comprising a radiation grafted fluoropolymer, preferably in the form of a powder coating composition, offering a strong adhesion on an inorganic substrate and an excellent protection, especially from corrosion.

THE PRIOR ART

Application WO 98/20071 discloses the use of a fluoropolymer comprising an inorganic filler for improving the protection of metal surfaces from corrosion. No mention is made of fluoropolymer modified by grafting by irradiation. Patent EP 0 976 544 discloses a fluoropolymer obtained by copolymerization of a fluoromonomer carrying a polar group and of a fluoromonomer without a polar group. This copolymer is used to coat metal, glass or ceramic surfaces. Not only is no mention made of fluoropolymer modified by grafting by irradiation but the copolymerization of a specific fluoromonomer requires that the manufacturing process be adjusted.

Application EP 0 650 987 discloses a fluoropolymer to which a polar compound, such as maleic anhydride, is grafted. The grafting is carried out in the melt using a radical initiator. The polymer modified by grafting is applied directly to an inorganic material after the grafting.

Application U.S. patent application Ser. No. 11/039,979 describes an acrylic-modifed polyvinylidene fluoride coating containing a polyepoxide, that can be applied to un-primed substrates.

In order to improve the adhesion to un-primed substrates, the PVDF coating includes crosslinking functionality into the composition but at extra expense.

Patent U.S. Pat. No. 6,362,295 describes an acrylic-modified polyvinylidene fluoride powder coating is described. The powder can be applied to a substrate both with and without a primer. The effectiveness of this system is lower than with a radiation grafted fluoropolymer.

No mention is made, in these documents of the prior art, of a radiation grafted fluoropolymer which can be used to form a coating on an inorganic substrate.

BRIEF DESCRIPTION OF THE INVENTION

The invention relates to a coating composition that comprises:
  at least one radiation grafted fluoropolymer
  optionally at least one non-functionalized fluoropolymer
  optionally at least one acrylic polymer.

The coating composition can be in the form in the form of pellets, in the form of a powder or in solution. Preferably, the coating composition is in the form of a powder for coating metals without the need tor a primer comprising a blend of:
  at least one radiation grafted fluoropolymer, and
  at least one non-functionalized fluoropolymer.

The invention also relates to a coated inorganic substrate comprising a layer of the coating composition and wherein no primer is present between the coating and the inorganic substrate. It further relates to a coated inorganic substrate having a powder coating composition, directly adhered thereto, wherein no primer is present between the powder coating and the substrate.

The invention further relates to a process for coating an inorganic substrate without the use of a primer comprising the steps of:
  a). applying on the substrate the powder coating composition; and
  b). curing said applied powder coating.

The invention further relates to the use of the coating composition to protect an inorganic substrate, especially from corrosion.

DETAILED DESCRIPTION OF THE INVENTION

French patent application 04.11068 and U.S. patent provisional applications 60/647,196 and 60/702,110 are all incorporated herein by reference.

The term fluoromonomer refers to an unsaturated monomer of formula (I):

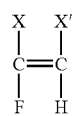

(I)

in which X and X' can be, independently of one another, a hydrogen atom, a halogen, in particular fluorine or chlorine, or a perhalogenated, in particular perfluorinated, alkyl.

Suitable exemplary fluoromonomers for use according to the invention include, but are not limited to, vinylidene fluoride (VDF, $CH_2=CF_2$), vinyl fluoride, trifluoroethylene, tetrafluoroethylene (TFE), hexafluoropropylene (HFP) and chlorotrifluoroethylene (CTFE). Mention may also be made of, 2-chloropentafluoro-propene, perfluoroalkyl vinyl ethers, such as $CF_3$—O—F=$CF_2$ or $CF_3$—$CF_2$—O—CF=$CF_2$, 1-hydropentafluoropropene, 2-hydropentafluoropropene, dichlorodifluoroethylene, trifluoroethylene, 1,1-dichlorofluoroethylene and perfluoro-1,3-dioxoles, such as those described in U.S. Pat. No. 4,558,142. Fluorine-comprising diolefins can be mentioned as well, for example diolefins, such as perfluorodiallyl ether and perfluoro-1,3-butadiene.

The term fluoropolymer refers to polymer and copolymers (including polymers having two or more different monomers, such as terpolymers) containing at least 50 mole percent of fluoromonomer units. The polymers and copolymers are obtained by the radical polymerization of at least one fluoromonomer of formula (I). Unsaturated olefinic monomers not comprising fluorine, such as ethylene, propylene, butylene and higher homologues, may also be used as comonomers.

The fluoropolymer is produced by processes known in the state of the art. The fluoropolymer can be prepared in aqueous emulsion or in aqueous suspension. The emulsion comprise, for example, a water-soluble initiator, such as an alkali metal or ammonium persulfate or an alkali metal permanganate, which produce free radicals, and also comprise one or more emulsifiers, such as alkali metal or ammonium salts of a perfluorooctanoic acid. Other aqueous colloidal suspension processes use initiators which are essentially soluble in the organic phase, such as dialkyl peroxides, alkyl hydroperoxides, dialkyl peroxydicarbonates or azoperoxides, the initiator being used in combination with colloids of the following types: methylcelulluloses, methylhydroxypropylcelluloses, methylpropylceluloses and methylhydroxyethylcelluloses. In particular, patents U.S. Pat. No. 3,553,185 and EP 0120524 disclose processes for the synthesis of PVDF by suspending VDF in water and polymerizing it. Patents U.S. Pat. No. 4,025,709, U.S. Pat. No. 4,569,978, U.S. Pat. No. 4,360,652, U.S. Pat. No. 6,263,96 and EP 0655468 disclose processes for the synthesis of PVDF by emulsifying VDF in water and polymerizing it.

Preferably, the fluoropolymer is a PVDF, that is a homo- or copolymer of VDF containing by weight at least 50% VDF, advantageously at least 75% VDF and preferably at least 85% VDF. PVDF is preferred as it provides very good chemical and thermornechanical resistance and it is easily extruded. As regards the PVDF copolymers, they are obtained through the copolymerization of VDF and at least one comonomer selected from the group consisting of vinyl fluoride, trifluoroethylene, tetrafluoroethylene (TFE), hexafluoropropylene (HFP), chlorotrifluoroethylene (CTFE), 2-chloropentafluoro-propene, perfluoroalkyl vinyl ethers, such as $CF_3$—O—CF=$CF_2$ or $CF_3$—$CF_2$—O—CF=$CF_2$, 1-hydropentafluoropropene, 2-hydropentafluoropropene, dichlorodifluoroethylene, 1,1-dichlorofluoroethylene and perfluoro-1,3-dioxoles, such as those described in U.S. Pat. No. 4,558,142. Fluorine-comprising diolefins can be mentioned as well, for example diolefins, such as perfluorodiallyl ether and perfluoro-1,3-butadiene.

Preferably, the PVDF is a homo- or copolymer of VDF and HFP and/or TFE and/or vinylidene trifluoride and/or CTFE. Preferably, it is a VDF/HFP copolymer. Preferably, the PVDF has a melt viscosity between 1 and 8 kP measured at 230° C. and 100 $s^{-1}$.

The PVDFs commercialized under the brand name KYNAR® can be used.

The definition of the fluoropolymer applies equally to the non-functionalized fluoropolymer and to the fluoropolymer from which the radiation grafted fluoropolymer is derived.

The radiation grafted fluoropolymer is a fluoropolymer that has been chemically modified by radiation grafting. The grafting is carried out in the bulk of the polymer and not on its surface according to the following process:
a) melt-blending a fluoropolymer and at least one graftable compound;
b) the blend obtained is made in the form of granules or powder;
c) irradiating this blend in the solid state by irradiation (which can be a γ or β radiation) with a dose of between 1 and 15 Mrad, optionally after having removed the residual oxygen; and
d) optionally removing the graftable compound that has not been grafted and the residues liberated by the grafting, especially HF.

The blend is obtained by any melt blending techniques known in the art, preferably using an extruder.

The irradiation is done with an electron or photon source. The radiation dose is between 10 and 200 kGray, preferably between 1 0 and 150 kGray. Irradiation using a cobalt bomb is preferred. During step c), it is preferable to prevent oxygen from being present, for instance by flushing the fluoropolymer/graftable compound blend with nitrogen or argon.

The graftable compound is grafted in an amount of 0.1 to 5% by weight (i.e. the grafted graftable compound corresponds to 0.1 to 5 parts per 99.9 to 95 parts of fluoropolymer), advantageously 0.5 to 5% and preferably 1 to 5%. The content of grafted graftable compound depends on the initial content of the graftable compound in the fluoropolymer/graftable compound blend to be irradiated. It also depends on the grafting efficiency, and therefore on the duration and the energy of the irradiation.

Step d) can sometimes be optional if the amount of graftable compound that has not been grafted is low or not detrimental to the adhesion of the modified fluoropolymer. Step d) may be carried out using techniques known to those skilled in the art. Vacuum degassing may be applied, optionally heating at the same time. It is also possible to dissolve the modified fluoropolymer in a suitable solvent, such as for example N-methylpyrrolidone, and then to precipitate the polymer in a non-solvent, for example in water or else in an alcohol.

One of the advantages of this radiation grafting process is that it is possible to obtain higher contents of grafted graftable compound than with conventional grafting processes using a radical initiator. Thus, typically, with the radiation grafting process it is possible to obtain contents of greater than 1% (1 part of graftable compound per 99 parts of fluoropolymer), or even greater than 1.5%, whereas with a conventional grafting process carried out in an extruder the content is lower and sometimes is not feasible.

The radiation grafting takes place "cold", typically at temperatures below 100° C., or even below 70° C., so that the fluoropolymer/graftable compound blend is riot in the melt state, as in the case of a "conventional" grafting process that is carried out in an extruder. One essential difference with a "conventional" grafting process is therefore that, in the case of a semicrystalline fluoropolymer (as is the case with PVDF for example), the grafting takes place in the amorphous phase and not in the crystalline phase, whereas homogeneous grafting is produced in the case of grafting carried out in an extruder. The graftable compound is therefore not distributed among the fluoropolymer chains in the same way in the case of radiation grafting as in the case of grafting carried out in an extruder. The modified fluoropolymer product therefore has a different distribution of the graftable compound among the fluoropolymer chains compared with a product that would be obtained by grafting carried out in an extruder. This makes it possible to obtain better adhesion properties than grafting using a radical initiator.

The radiation grafted fluoropolymer exhibits the very good resistance to chemicals and oxidation, and also the thermal mechanical strength of the fluoropolymer before being grafted.

With regard to the graftable compound, this possesses at least one double bond $C=C$, and at least one polar functional group that may be one of the following functional groups:
a carboxylic acid;
a carboxylic acid salt;
a carboxylic acid anhydride;
an epoxide;
a carboxylic acid ester;
a silyl;
an alkoxysilane;
a carboxylic amide;
a hydroxyl;
an isocyanate.

It is also possible to envisage mixtures of several graftable compounds.

As examples of graftable compounds, we mention methacrylic acid, acrylic acid, undecylenic acid, zinc, calcium or sodium undecylenate, maleic anhydride, dichloromaleic anhydride, difluoromaleic anhydride, itaconic anhydride, crotonic anhydride, glycidyl acrylate, glycidyl methacrylate, allyl glycidyl ether and vinylsilanes, such as vinyltrimethoxysilane, vinyltriethoxysilane, vinyltriacetoxysilane and γ-methacryloxypropyltrimethoxysilane.

Preferably, to obtain good adhesion, an anhydride or else zinc, calcium or sodium undecylenates will be chosen. These graftable compounds also have the advantage of being solids, which makes it easier to introduce them into an extruder. Maleic anhydride is most particularly preferred as it has a reactive group that allows good adhesion on many types of substrates.

Because of the presence of a $C=C$ double bond in the graftable compound, polymerization of the graftable compound, to give polymer chains either grafted onto the fluoropolymer, or free chains, that is to say those not attached to the fluoropolymer, is not excluded. The term "polymer chain" is understood to mean a chain-linking of more than ten units of the graftable compound. Within the context of the invention, it is preferable to limit the presence of grafted or free polymer chains, and therefore to seek to obtain chains with fewer than ten un its of the graftable compound. Chains limited to fewer than five graftable compound units will be preferred, and those having fewer than two graftable compound units will be even more preferred. Grafting only one compound unit is most preferred.

Likewise, it is not excluded for there to be more than one $C=C$ double bond in the graftable compound. Thus, for example, graftable compounds such as allylmethacrylate, trimethylolpropane trimethacrylate or ethylene glycol dimethacrylate may be used. However, the presence of more than one double bond in the graftable compound may result in crosslinking of the fluoropolymer, and therefore in a modification of the rheological properties, or even the presence of gels, which is not desirable. It may then be difficult to obtain a high grafting efficiency while still limiting crosslinking. Thus, the graftable compounds containing only a single $C=C$ double bond are preferred. The preferred graftable compounds are therefore those possessing a single $C=C$ double bond and at least one polar functional group.

From this standpoint, an anhydride and also zinc, calcium and sodium undecylenates constitute good graftable compounds as they have little tendency to polymerize or even to give rise to crosslinking. Maleic anhydride is most particularly preferred.

As regards the coating composition, it comprises:
at least one radiation grafted fluoropolymer
optionally at least one non-functionalized fluoropolymer
optionally at least one acrylic polymer.

More particularly, the invention relates to a powder coating composition for coating metals without the need for a primer comprising a blend of:
at least one radiation grafted fluoropolymer, and
at least one non-functionalized fluoropolymer.

The powder coating composition may further comprise also an acrylic polymer.

The coating composition comprises from 90 to 10 parts, preferably from 70 to 30 parts, of radiation grafted fluoropolymer per 10 to 90 parts, preferably per 30 to 70 parts, of the non-functionalized fluoropolymer and/or the acrylic polymer.

The non-functionalized fluoropolymer and the acrylic polymer may be present either for reasons of cost or in order to obtain a compromise in physicochemical and/or mechanical properties and better protection of the substrate. The choice depends on the nature of the substrate to be protected and on the type of protection envisaged. Thus, the coating composition may comprise the radiation grafted fluoropolymer and:
at least one non-functionalized fluoropolymer, or
at least one acrylic polymer, or
a combination of at least one non-functionalized fluoropolymer and at least one acrylic polymer.

The coating composition may comprise only the radiation-grafted fluoropolymer and the non-functionalized fluoropolymer, but preferably, an acrylic polymer is also present. Thus, the coating composition preferably comprises a combination of at least one non-functionalized fluoropolymer and at least one acrylic polymer. The proportion of non-functionalized fluoropolymer should preferably be by weight at least 70% of the non-functionalized fluoropolymer and the acrylic polymer. The proportion of non-functionalized fluoropolymer should be by weight between 70 and 99%, advantageously between 80 and 95%, preferably between 80 and 90%, with respect to the non-functionalized fluoropolymer and the acrylic polymer.

The non-functionalized fluoropolymer is chosen in the list of fluoropolymers given above. It is preferably a PVDF homo- or copolymer.

It may be wise to combine a radiation grafted fluoropolymer with an non-functionalized fluoropolymer which is different in nature, so as to obtain a compromise in physicochemical and/or mechanical properties and consequently better protection of the substrate. Thus, for example, the radiation grafted fluoropolymer can be derived from a PVDF homo- or copolymer and the non-functionalized fluoropolymer may be a tetrafluoroethylene homo- or copolymer. Another example relates to the case where the radiation grafted fluoropolymer and the non-functionalized fluoropolymer are two PVDF homo- or copolymers having two different melt flow indices.

The MFI (abbreviation for Melt Flow Index) of the radiation grafted fluoro-polymer and of the unfunctionalized fluoropolymer is advantageously between 5 and 30 g/10 min (at 230° C. under a load of 5 kg) for a PVDF homopolymer and between 5 and 30 g/10 min (at 230° C. under a load of 5 kg) for a copolymer of VDF and of HFP.

The acrylic polymer is chosen from the list of homo- or copolymers comprising at least 50% by weight of an alkyl (meth)acrylate. Methyl methacrylate homo- and copolymers (PMMA) comprising by weight at least 50%, advantageously at least 75% preferably at least 90% of methyl methacrylate are preferred. Mention may be made, as examples of comonomers, for example, of alkyl (meth)acrylates, acrylonitrile, butadiene, styrene or isoprene. Examples of alkyl (meth) acrylates are described in Kirk-Othmer, Encyclopedia of Chemical Technology; $4^{th}$ edition, in volume 1, pages 292-293, and in volume 16, pages 475-478. Advantageously, the acrylic polymer can comprise 0 to 20% by weight and preferably 5 to 15% of at least one other alkyl (meth)acrylate, such as, for example, methyl acrylate and/or ethyl acrylate. The acrylic polymer can be functionalized, that is to say that it comprises, for example, acid, acid chloride, alcohol, anhydride and ureido functional groups. These functional groups can be introduced by grafting or by copolymerization. As regards the acid functional group, this is advantageously an acid functional group contributed by the acrylic or methacrylic acid comonomer. Two neighbouring acrylic acid functional groups can dehydrate to form an anhydride functional group, which would not be a nuisance for the application. The proportion of functional groups can be from 0 to 15% by weight of the acrylic polymer comprising the optional functional groups. The acrylic polymer can also optionally comprise from 5 to 30% by weight of impact additives well known to a person skilled in the art.

A coating composition can be obtained by melt blending, preferably in an extruder:
20-50 parts of a radiation grafted fluoropolymer, preferably a radiation grafted PVDF
20-50 parts by weight of a non-functionalized fluoropolymer, preferably a PVDF;
and 30 parts of an acrylic polymer, preferably a PMMA homo- or copolymer.

So as to obtain a powder coating composition, the blend (in the form of pellets when an extruder is used) is then cryogenically ground into a powder and classified into a suitable particle size range for powder application, typically between 1-100 μm, with a mean particle size between 25-75 μm. This will produce a non-pigmented "clear coat" powder coating. Addition of suitable pigments at the extrusion stage (at levels known by those skilled in the art of powder coatings manufacture) will produce a pigmented powder coating after the grinding process. This melt blending/grinding/classifying process is the preferred method to practice this invention. A second method for pigmentation involves dry blending of pigments with the "clear coat" powder. This second approach is less preferable due to variation of dry pigment blending, but is advantageous for preparing small batches of custom colors. Regardless, the melt blending of all the polymer resin components (PVDF, radiation grafted PVDF, PMMA) is the preferable blending method.

Preferably, the PVDF has a melt viscosity between 1 and 8 kP (measured at 230° C. and 100 $s^{-1}$). Preferably, the radiation grafted PVDF is derived from a PVDF homopolymer. Preferably, maleic anhydride is grafted onto the PVDF. Preferably, the PMMA is a copolymer of methyl methacrylate and ethyl acrylate comprising between 1 and 10% of ethyl acrylate. Preferably, the PMMA has a molecular weight between 30000 and 100000 g/mol.

Preferably, the coating composition further comprises one or more additives. The additives may be, but are not limited to, pigments, fillers, extenders, plasticizers, impact modifiers or additives to improve aging resistance, and UV stabilizers.

The UV stabilizer is preferably of a high molar mass (>200 g/mol), so as to prevent it from dissipating or evaporating. As an example, it can be a UV stabilizer of benzotriazole, oxalic acid, benzophenone, HALS or hindered amine type. More specifically, it can be, as examples, 2-[3,5-di($\alpha,\alpha$-dimethylbenzyl)-2-hydroxyphenyl]benzotriazole, 2-(3,5-di(t-butyl)-2-hydroxyphenyl)benzotriazole, 2-(3-(t-butyl)-5-methyl-2-hydroxyphenyl)-5-chlorobenzotriazole, 2-(3,5-di(t-butyl)-2-hydroxyphenyl)-5-chlorobenzotriazole, 2-(3,5-di(t-amyl)-2-hydroxyphenyl)benzotriazole, 2-ethoxy-2'-ethyl oxalic acid bisanilide, 2-ethoxy-5-(t-butyl)-2'-ethyl oxalic acid bisanilide, 2-hydroxy-4-(n-octoxy)benzophenone, bis(1,2,2,6,6-pentamethyl-4-piperidyl) sebacate, bis(1,2,2,6,6-tetramethyl-4-piperidyl) sebacate, dimethyl-2-(4-hydroxy-2,2,6,6-tetramethyl-1-piperidyl) ether or 1-[2-3-(3,5-di(t-butyl)-4-hydroxyphenyl)propionyloxy]-2,2,6,6-T-tetramethylpiperidine. Preferably, when the coating composition comprises anacrylic polymer, the UV stabilizer is chosen from UV stabilizers which are compatible with the acrylic polymer. The UV stabilizer, when present, is advantageously present in the coating composition in the amount of from about 0.1 to about 10 parts by weight per 100 parts of polymer(s). While for most applications the preferred range is from about 1 to about 5 parts by weight pigment per 100 parts of polymer(s).

The coating composition may be pigmented or non-pigmented. If pigmented, the pigments may be inorganic or organic and include, but are not limited to titanium dioxide, silica, iron oxides of various colors, mixed metal oxides of various colors, various silicates, talc, diatomaceous earth, mica, clay, zinc oxide, zinc sulfide, zirconium oxide, carbon black, leafing and non-leafing metallic pigments, molybdate orange, calcium carbonate and barium sulfate. The pigment component, when present, is advantageously present in the composition in the amount of from about 0.1 to about 50 parts by weight per 100 parts of polymer(s). While for most applications the preferred range is from about 5 to about 20 parts by weight pigment per 100 parts of polymer(s).

The additives may be present in the individual polymers before blending or may be added after the polymers have been blended.

As regards the form of the coating composition and the process to apply it, the coating composition can be in the form of pellets, in the form of a powder or in solution. When the coating composition is in the form of pellets, any melt blending technique known to a person skilled in the art, for example by using an extruder, followed by any pelletizing technique known to one skilled in the art, can be used.

When the coating composition is in the form of a solution, the solution is prepared by dissolving in a solvent (for example in N-methylpyrrolidone) the polymers either individually or after preblending. The polymers that are dissolved may be in the form of pellets or in the form of powders.

When the coating composition is in the form of powders, the polymers may be blended prior to powderization, or may be dry blended after individual powderization. Any technique of powderization, such as by spray drying, freeze drying, cryogenical grinding, non-cryogenical grinding, ultrasonication, or other methods known to one skilled in the art, can be used.

The blending step may be carried out in any order. For instance, when the coating composition comprises a radiation grafted fluoropolymer, a non-functionalized fluoropolymer and an acrylic polymer, all polymers may be blended together, for instance in an extruder, or there may be a preblending step involving the non-functionalized fluoropolymer and the acrylic polymer, prior to blending such blend with the radiation grafted fluoropolymer.

The coating composition can be applied directly to the substrate in the molten state, in solution or in the powder state. Application in the molten state can be carried out by coating, rolling or spread coating.

Preferably, the coating composition is in the form of a powder and the coating composition is applied in the powder state by any known conventional application method which will provide an uniform coating. Typical techniques are fluidized bed, thermal spray, or preferably electrostatic coating. The coating may be applied to one or more surfaces of the substrate. After application, the coating is subjected to curing at a temperature above the melt temperature of the coating composition, preferably between about 220° C. and 250° C.

The thickness of the applied coating depends on the nature of the substrate to be protected. Generally the final coating thickness is between 10 and 5000 μm, preferably, between 10 and 1000 μm, and more preferably between 10 and 500 μm. Each layer (that is the coating composition and the optional layer(s) made of acrylic polymer) can have a thickness between 10 and 5000 μm.

As regards the substrate to be coated, the latter is an inorganic substrate comprising a layer of the coating composition wherein no primer is present between the coating and the inorganic substrate. The invention further relates to a coated inorganic substrate, especially an un-primed metal, having directly adhered thereto the coating composition, preferably the powder coating composition. The invention thus relates to a coated inorganic substrate having a layer of the coating composition directly adhered thereto, wherein no primer is present between the coating and the inorganic substrate.

All variants described above for the coating composition apply also for the coated inorganic substrate.

According to a specific form of the invention, it is possible to add to the coating according to the invention at least one layer comprising at least one acrylic polymer. Said layer is directly attached to the layer of the coating composition.

The acrylic polymer is chosen from the same list of acrylic polymers as previously given. The acrylic polymer of this layer can optionally also be modified by a compatible non-functionalized fluoropolymer chosen from the same list of fluoropolymers as that given above and can optionally comprise a UV stabilizer.

The layer of acrylic polymer thus comprises from 100 to 10 parts of acrylic polymer per 0 to 90 parts of non-functionalized fluoropolymer. This layer can also comprise a UV stabilizer, the content of which can vary from 0 to 10% by weight with respect to the acrylic polymer optionally modified by the fluoropolymer.

According to the invention, it may therefore be possible to find a protective coating with a single layer of acrylic polymer or else with several different layers, for example two different layers of acrylic polymer.

The inorganic substrate may be a metal, glass, quartz, ceramics, concrete or silicon. Preferably, it is selected from the group consisting of metal, concrete and ceramics. Preferably, the metal is un-primed and is aluminum or steel (this includes also stainless steel). In the case of aluminium, the alloys of the 2000, 3000, 5000 and 6000 series of the Aluminum Association Inc. Register are included.

The term "metal" also covers other types of metals, for example, iron, copper, aluminium, titanium, lead, tin, cobalt, silver, tungsten, nickel or zinc. The term "metal" also covers the mixtures of these metals and their alloys. Possible alloys are steels, such as, for example, carbon, nickel, chromium, nickel/chromium, chromium/molybdenum or silicon steels, stainless steel, cast iron or Permalloy. Alloys of aluminium are, for example, aluminium/magnesium, aluminium/silicon, aluminium/copper/nickel/magnesium or aluminium/silicon/copper/nickel/ magnesium alloys. Copper alloys are, for example, brass, bronze, silicon bronze, silicon brass or nickel bronze. Nickel alloys are, for example, nickel/magnesium (nickel D), nickel/aluminium (nickel Z) or nickel/silicon alloys, Monel, or Hastelloy. Aluminium alloys also include aluminium oxides, as well as, for example, aluminium/copper, aluminium/silicon, aluminium/manganese or aluminium/copper/nickel/manganese alloys.

The metal substrate can be subjected beforehand to a physical and/or chemical pretreatment, the purpose of which is to clean the metal surface and to promote the adhesion of the coating. The possible pretreatments are as follows: alkaline degreasing, degreasing by solvents, such as trichloroethylene, brushing, shot blasting, phosphatizing, chromium plating, anodizing (for example, for aluminium and its alloys), chromium anodizing, silanization, abrasion, pickling and in particular sulphochromic pickling. A possible pretreatment can consist in applying an adhesion promoter. Adhesion promoters have been described by Cassidy P. E. in the review *Ind. Eng. Chem. Prod. Res. Development,* 1972, Volume 11, No. 2, p. 170-177, or by Kinlock A. J. in *J. Mat. Sci.,* 1980, 15, p. 2141-66. Mention may be made, by way of examples, as possible chemical pretreatments, of Alodine NR1453, Alodine NR2010, Accomet C or Safeguard 6000. The pretreatment can also consist of a combination of these various pretreatments, in particular the combination of a physical pretreatment and of a chemical pretreatment.

In the case where the substrate to be coated is a metal, it can exist in various forms and geometries, such as, for example, in the form:
- of an elongated surface, such as, for example, a sheet, a plate or a leaf,
- of a hollow body, such as, for example, a receptacle, a container, a bottle, a carboy or a chemical reactor,
- of a pipe, of an elbow, of a valve, of a punch or of a pump,
- of a yarn, strand, cable or stay,
- of an electrode.

The protective coating according to the invention lends itself particularly well to the protection of flexible metal pipes for the extraction and/or the transportation of gases and hydrocarbons in the oil and gas industries. This is because the materials which are used in these industries are brought into contact with particularly aggressive substances (such as hydrocarbons, strong acids, solvents, inorganic and organic bases, and the like).

The term "glass" covers any type of glass, for example silica-soda-lime glass, borosilicate glass, ceramic glass or lead glasses. Reference may be made to the list of glasses given in Ullmann's Encyclopedia, $5^{th}$ edition, volume A12, pages 382-383, Table 9.

Applications of the Coating Composition

The coating composition can be used to protect the inorganic substrate. It offers UV resistance, exterior durability, abrasion resistance and/or impact resistance.

It also offers protection from corrosion. Each substrate may undergo corrosion which is specific to it. Thus, in the case of a metal, there exist several types of corrosion depending on the nature of the metal and of the aggressive medium to which it is subjected. Corrosion can thus be localized or non-localized, by pitting, intergranular, under stress, and the like. In the chemical industry in particular, metal components are often subjected to highly corrosive media (for example acids, such as sulphuric acid, hydrochloric acid, nitric acid, hydrobromic acid or hydrofluoric acid, bases, such as sodium hydroxide or potassium hydroxide, highly corrosive gases, such as fluorine, bromine, chlorine or ammonia, and the like). In everyday life, metal components may be subject to atmospheric corrosion (under the effect of the combination of air and water) or else to salt corrosion (in a marine environment, for example).

Glass can be corroded by hydrofluoric acid or else concentrated basic solutions, such as, for example, concentrated sodium hydroxide solutions. Silicon can be corroded by bromine, chlorine or gaseous hydrobromic acid.

The applications of the coated substrates are primarily decorative where long term UV resistance, exterior durability, abrasion resistance and/or impact resistance are required. Typical examples are architectural exterior metal building parts (window frames, door frames, roofing, wall panels, aluminum extrusions, and the like) and automotive components. Use as functional coatings (for corrosion and/or wear resistance, for example) is also possible.

EXAMPLES

The following examples further illustrate the best mode contemplated by the inventors for the practice of their invention and are intended to be illustrative and not in limitation thereof.

The products used were the following:
PVDF: KYNAR® 710
acrylic resin: PARALOID® B-44 (with Mw 140000 g/mol).
pigments: SHEPHERD BROWN 39
KYNAR® ADX 111: modified PVDF containing 1% grafted maleic anhydride obtained according to the operating method described below, starting with a KYNAR® 710, a PVDF homopolymer of MFI=20 g/10 min at 230° C./5 kg.

KYNAR® ADX 111 was prepared as follows. A blend of KYNAR® 710 PVDF (from Arkema) and of 2 wt % maleic anhydride was prepared. This blend was prepared using a twin-screw extruder operating at 230° C. and 150 rpm with a throughput of 10 kg/h. The granulated product thus prepared was bagged, in aluminium-lined sealed bags, and then the oxygen was removed by flushing with a stream of argon. These bags were then irradiated by γ radiation ($Co^{60}$ bomb) at 3 Mrad (10 MeV acceleration) for 17 hours. A 50% grafting level was determined, this level being checked after a step of dissolving the material in N-methylpyrrolidone and then precipitation in a water/THF mixture (50/50 by weight). The product obtained after the grafting operation was then placed in a vacuum overnight at 130° C. in order to remove the residual maleic anhydride and the hydrofluoric acid released during the irradiation. The final grafted maleic anhydride content was 1% (determined by infrared spectroscopy on the C=O band at around 1870 $cm^{-1}$).

The aluminum panels were supplied with a chromate pretreatment ("chromated" aluminum panels) and were rinsed with acetone prior to use.

Example 1

A powder blend was prepared using pre-formulated PVDF-acrylic powder coat and grafted PVDF by dry blending as follows: A sample of formulated PVDF-acrylic powder coating (a formulation consisting of the acrylic resin 24-27 parts, PVDF resin 56-63 parts, and pigments 10-20 parts, melt blended then cryo-ground; the powder has a mean size of 45 μm and a distribution between 10 and 100 μm) of which 70 parts are blended with the modified PVDF (KYNAR® ADX 111) 30 parts using a dry blender mill. This homogeneous powder blend is ready for application.

The dry powder blend was applied to an unprimed chromated aluminum panel by electrostatic spray. The powder coated panel was then baked in a convection oven at 450° F. for 10 minutes. A very smooth, defect free coating resulted. The coating was tested by the following methods: cross-hatch adhesion (MMA 2605-98 7.4.1.1) direct and reverse impact (MMA 2605-98 7.5.1.1 & NCCA 4.2.6), cross hatch adhesion/reverse impact (NCCA 4.2.1.0), boiling water/cross hatch adhesion (AAMA 2605-98 7.4.1.3) and boiling water/cross hatch adhesion with reverse impact (a combination of AAMA 2605-98 7.4.1.3 and NCCA 4.2.1.0). This coating passed those tests satisfactorily, with no cracking, peeling, or coating pull-off with tape.

Example 2 (Comparative)

An aluminum panel was coated with the PVDF-acrylic powder coating of Example 1 that did not contain any KYNAR® ADX 111. This coating passed the cross hatch adhesion, direct impact, and indirect impact tests. However, after boiling water exposure, adhesion failure was noted both in the cross hatch adhesion and especially in the cross hatch adhesion/reverse impact tests. Chips of the paint were pulled off by tape, and coating delamination occurred in the reverse impact test.

Example 3 (Comparative)

The powder formulation of Example 2 (without any KYNAR® ADX 111) was applied to a panel to which a powder epoxy primer had been applied. Initial adhesion was good, but after boiling water exposure, coating delamination occurred in the cross hatch/reverse impact test.

Thus, as shown with examples 1-3, the grafted KYNAR® resin significantly improves the adhesion of KYNAR-acrylic powder coatings.

Example 4

A dry powder blend was prepared by mixing 50 parts of KYNAR® 710 powder (melt viscosity 4-8 kP at 230° C., 100 s$^{-1}$), 25 parts of KYNAR® ADX 111 and 30 parts of an acrylic copolymer of methylmethacrylate and ethylacrylate (PARALOID® B-88) methylmethacrylate 95%, ethylacrylate 5%) in a powder blender. The powder has a mean size of 45 μm and a distribution between 10 and 100 μm. The mixed blend was applied to chromated aluminum panels by electrostatic spray and baked by heating at 480° F. for 10 minutes. The clear coating was tested by the same methods described in Example 1. This coating passed all the adhesion tests, with no coating loss by tape pull-off.

Example 5 (Comparative)

A dry powder blend was prepared by mixing 70 parts of polyvinylidenefluoride powder (melt viscosity 4-8 kp at 230° C., 100 s$^{-1}$) and 30 parts of an acrylic copolymer (Paraloid B-88) of methylmethacrylate and ethylacrylate (methylmethacrylate 95% by weight, ethylacrylate 5%) in a powder blender. The powder has a mean size of 45 μm and a distribution between 10 and 100 μm. The mixed blend was applied to chromated aluminum panels by electrostatic spray and baked by heating at 480° F. for 10 minutes. The clear coating was tested by the same methods described in Example 1. This coating passed all the adhesion tests, except for reverse impact/boiling water and reverse impact/cross hatch/boiling water. In these tests, chips of the polymer coating were removed by tape pull.

The following examples further illustrate the presence of the additional acrylic polymer layer. There may be only a single layer of an acrylic polymer:
inorganic substrate/layer of the coating composition/layer of an acrylic polymer Illustrative Examples:
metaVPVDF homo- or copolymer grafted by maleic anhydride/methyl methacrylate homo- or copolymer
metaVPVDF homo- or copolymer grafted by maleic anhydride/50 to 90% methyl methacrylate homo- or copolymer+10 to 50% PVDF homo- or copolymer
metal/PVDF homo- or copolymer grafted by maleic anhydride/50 to 90% methyl methacrylate homo- or copolymer+10 to 50% PVDF homo- or copolymer with 4% of 2-hydroxy-4-(n-octoxy) benzophenone with respect to the blend of the two polymers Structures of this type are highly suitable for protecting aluminium.

There may be two different layers of acrylic polymer:
inorganic substrate/layer of the coating composition/layer of an acrylic polymer/another layer of acrylic polymer Illustrative Examples:
a metaVPVDF homo- or copolymer grafted by maleic anhydride/50 to 90% methyl methacrylate homo- or copolymer+10 to 50% PVDF homo- or copolymer/methyl methacrylate homo- or copolymer
metal/PVDF homo- or copolymer grafted by maleic anhydride/50 to 90% methyl methacrylate homo- or copolymer+10 to 50% PVDF homo- or copolymer with 4% of 2-hydroxy-4-(n-octoxy) benzophenone with respect to the blend of the two polymers/methyl methacrylate homo- or copolymer
metal/PVDF homo- or copolymer grafted by maleic anhydride/50 to 90% of a copolymer comprising 75% of methyl methacrylate and 25% of ethyl acrylate+10 to 50% of a PVDF homo- or copolymer with from 1 to 5% of Tinuvin 234 with respect to the blend of the two polymers/10 to 50% of a methyl methacrylate homo- or copolymer+50 to 90% of a VF$_2$ homo- or copolymer Structures of this type are also highly suitable for protecting aluminium.

The invention claimed is:

1. Coating composition for coating metals without the need for a primer comprising a blend of:
   a) at least one radiation grafted fluoropolymer, wherein a graftable compound is radiation grafted onto the fluoropolymer, and wherein said graftable compound is selected from the group consisting of an anhydride, zinc undecylenates, calcium undecylenates, and sodium undecylenates;
   b) at least one non-functionalized fluoropolymer, and
   c) at least one acrylic polymer
   wherein said coating composition is in the form of a powder.

2. Coating composition according claim 1, in which the coating composition comprises from 90 to 10 parts of radiation grafted fluoropolymer per 10 to 90 parts of the non-functionalized fluoropolymer and/or the acrylic polymer.

3. Coating composition according claim 2, in which the coating composition comprises from 70 to 30 parts of radiation grafted fluoropolymer per 30 to 70 parts of the non-functionalized fluoropolymer and/or the acrylic polymer.

4. Coating composition according to claim 1, in which the proportion of non-functionalized fluoropolymer is by weight at least 70% of the non-functionalized fluoropolymer and the acrylic polymer.

5. Coating composition according to claim 1, in which the proportion of non-functionalized fluoropolymer is by weight between 70 and 99% with respect to the non-functionalized fluoropolymer and the acrylic polymer.

6. Coating composition according to claim 5, in which the proportion of non-functionalized fluoropolymer is by weight between 80 and 90% with respect to the non-functionalized fluoropolymer and the acrylic polymer.

7. Coating composition according to any one of claim 1, in which the non-functionalized fluoropolymer or the fluoropolymer from which the radiation grafted fluoropolymer is derived, is any polymer or copolymer containing at least 50 mole percent of fluoromonomer units derived from fluoromonomer (I):

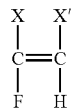
(I)

in which X and X' can be, independently of one another, a hydrogen atom, a halogen, in particular fluorine or chlorine, or a perhalogenated, in particular perfluorinated, alkyl.

8. Coating composition according to claim 1, in which the fluoropolymer is a homo- or copolymer of VDF containing by weight at least 50% VDF.

9. Coating composition according to claim 8, in which the fluoropolymer is a homo- or copolymer of VDF containing by weight at least 85% VDF.

10. Coating composition according to claim 1, in which the fluoropolymer is a homo- or copolymer of VDF and HFP and/or TFE and/or vinylidene trifluoride and/or CTFE.

11. Coating composition according to claim 1, in which the graftable compound is maleic anhydride.

12. Coating composition according to claim 1, in which the acrylic polymer is chosen from homo- or copolymers comprising at least 50% by weight of an alkyl (meth)acrylate.

13. Coating composition according to claim 1 further comprising one or more additives selected from the group consisting of pigments, fillers, extenders, plasticizers, impact modifiers, additives to improve aging resistance, and UV stabilizers.

* * * * *